Oct. 14, 1952        D. CAMERON        2,613,640
HAY STORAGE AND FEEDING BARN
Filed Oct. 30, 1950        6 Sheets—Sheet 1
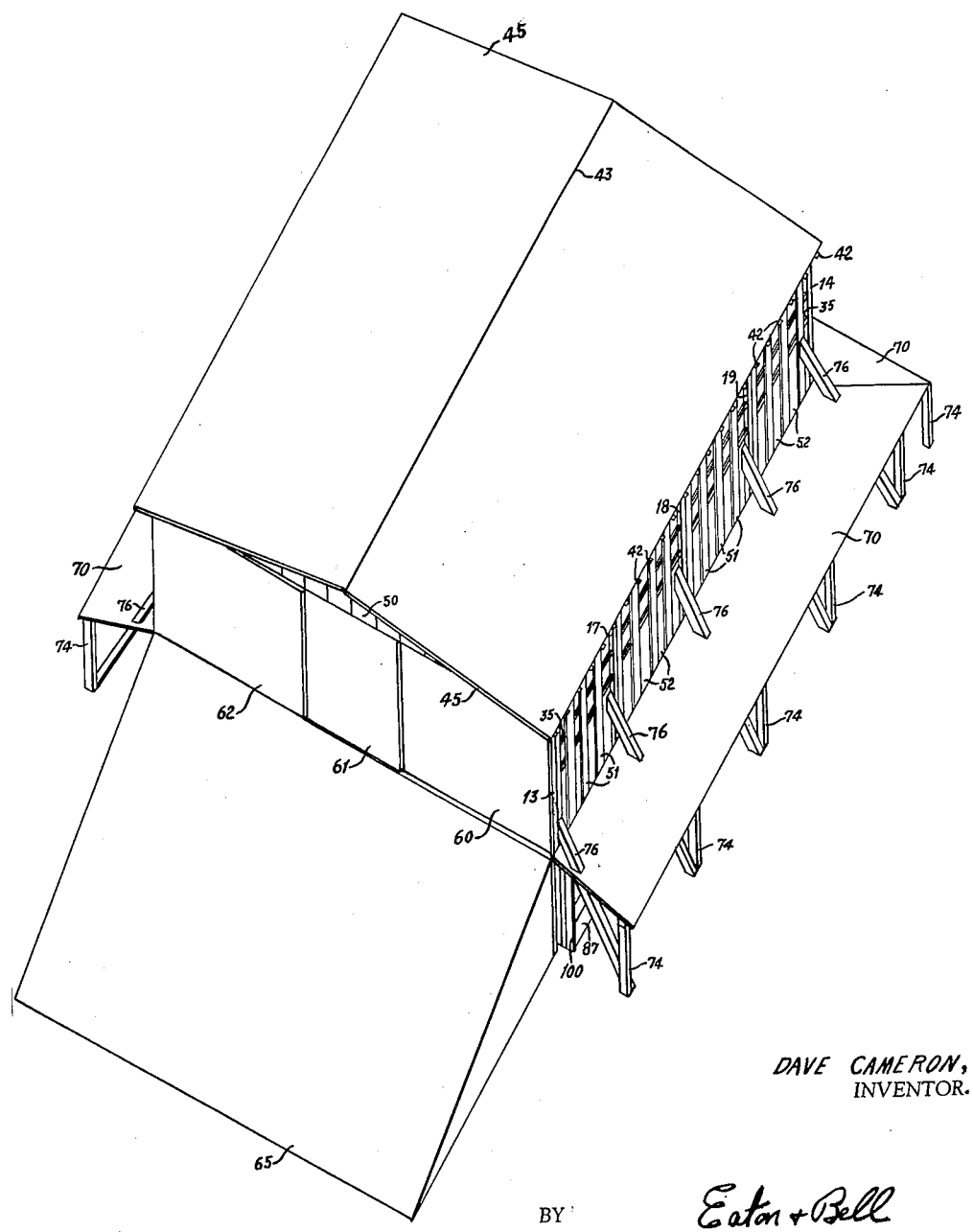
DAVE CAMERON,
INVENTOR.
BY Eaton + Bell
ATTORNEYS

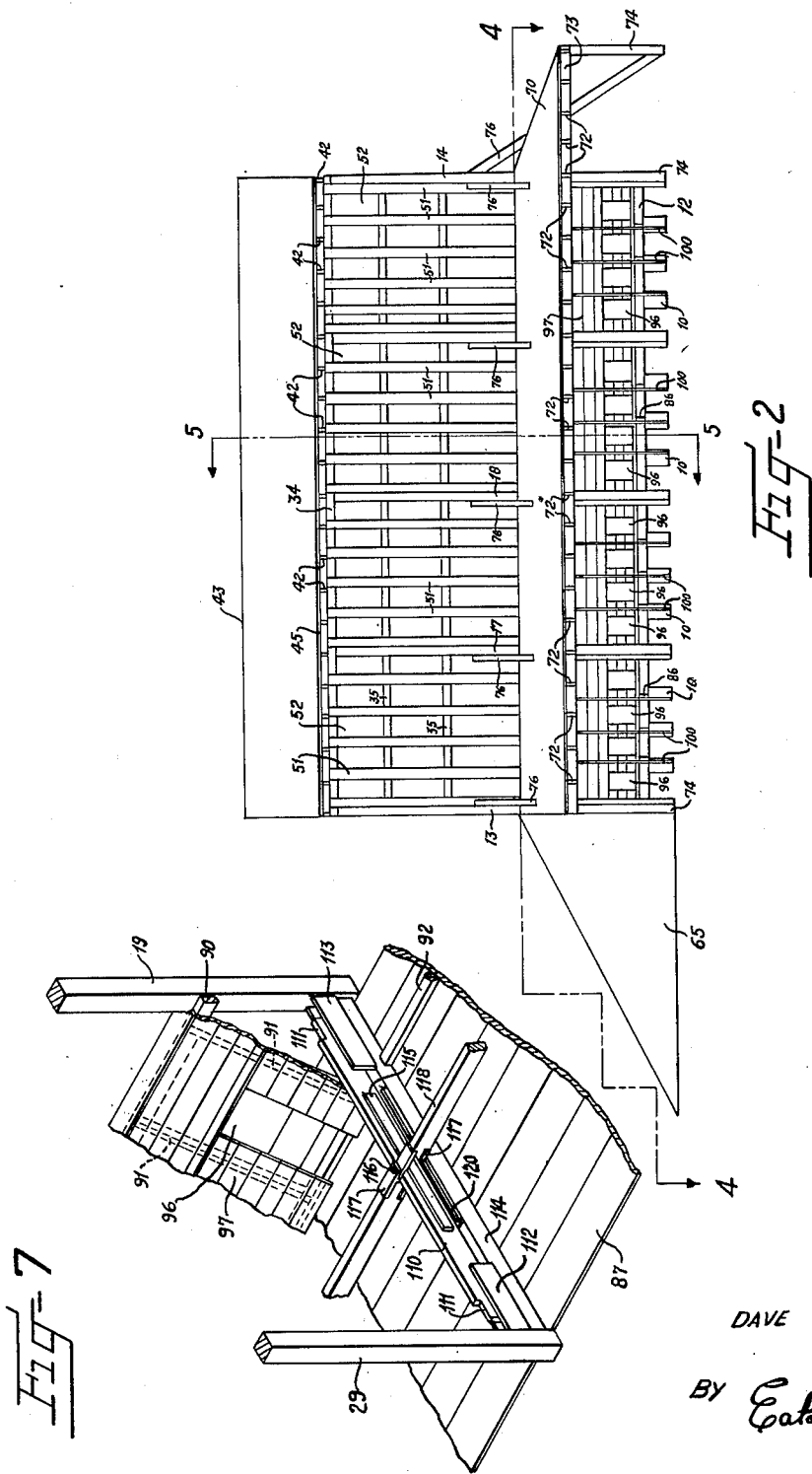
Oct. 14, 1952     D. CAMERON     2,613,640
HAY STORAGE AND FEEDING BARN
Filed Oct. 30, 1950     6 Sheets—Sheet 2
INVENTOR:
DAVE CAMERON
BY Eaton + Bell
ATTORNEYS

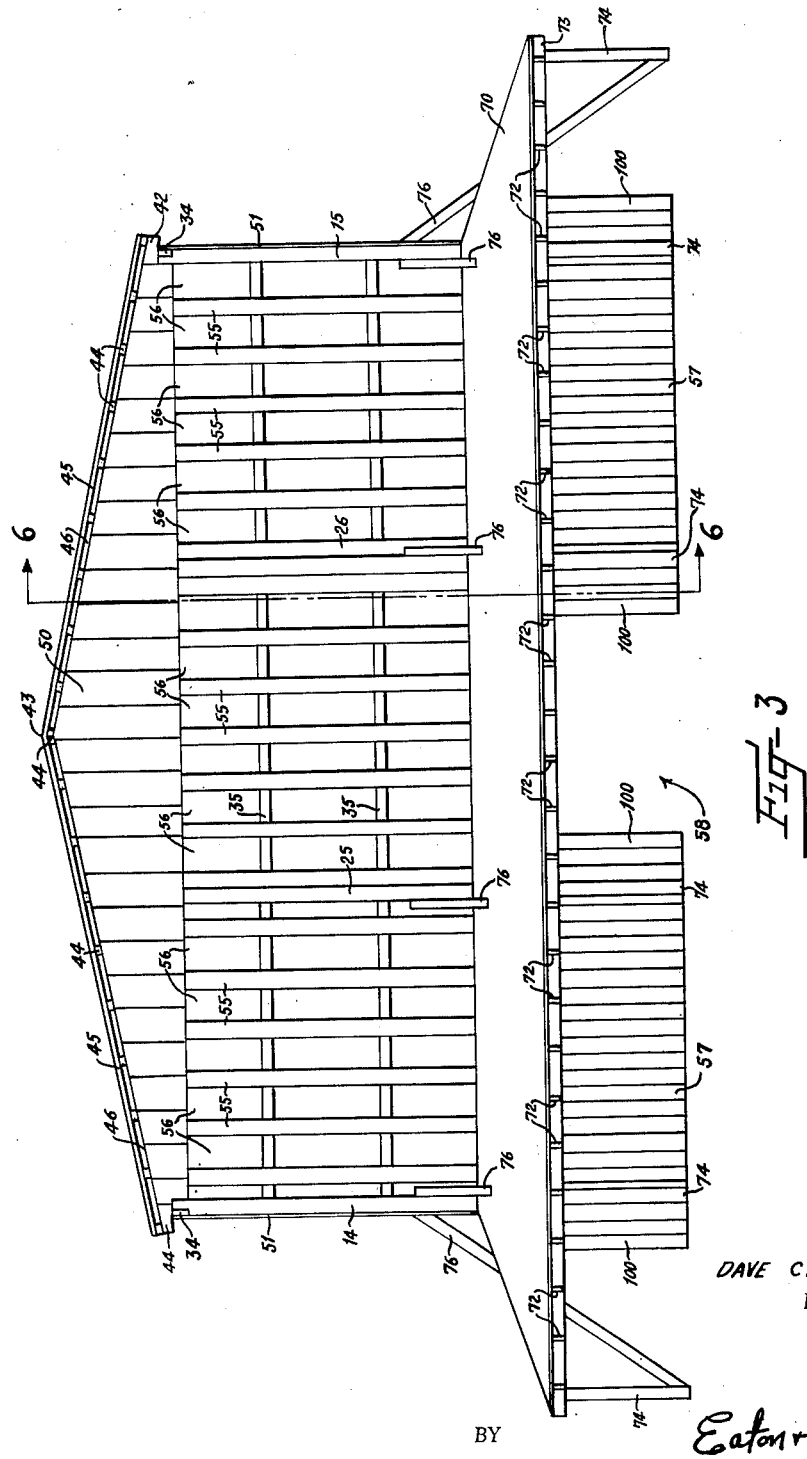

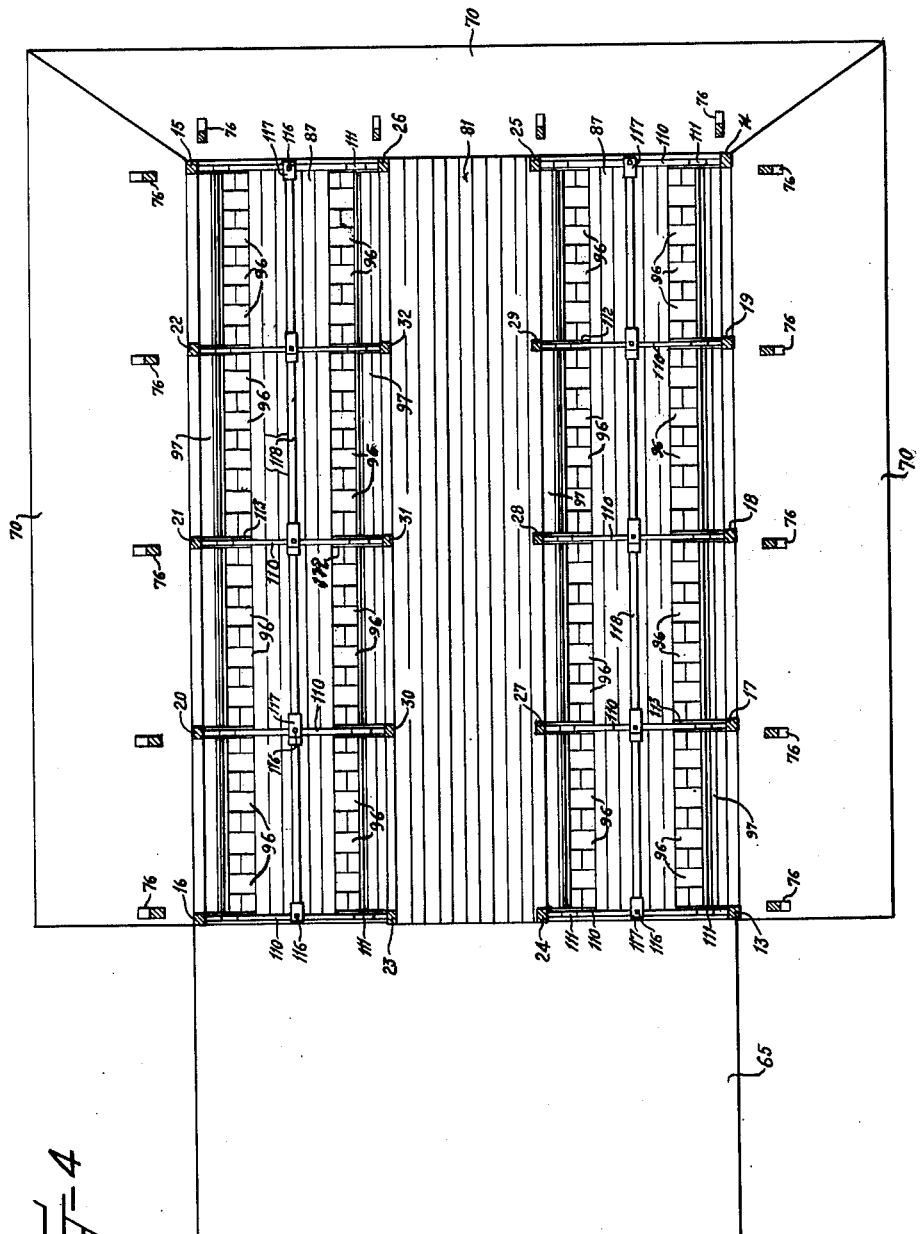

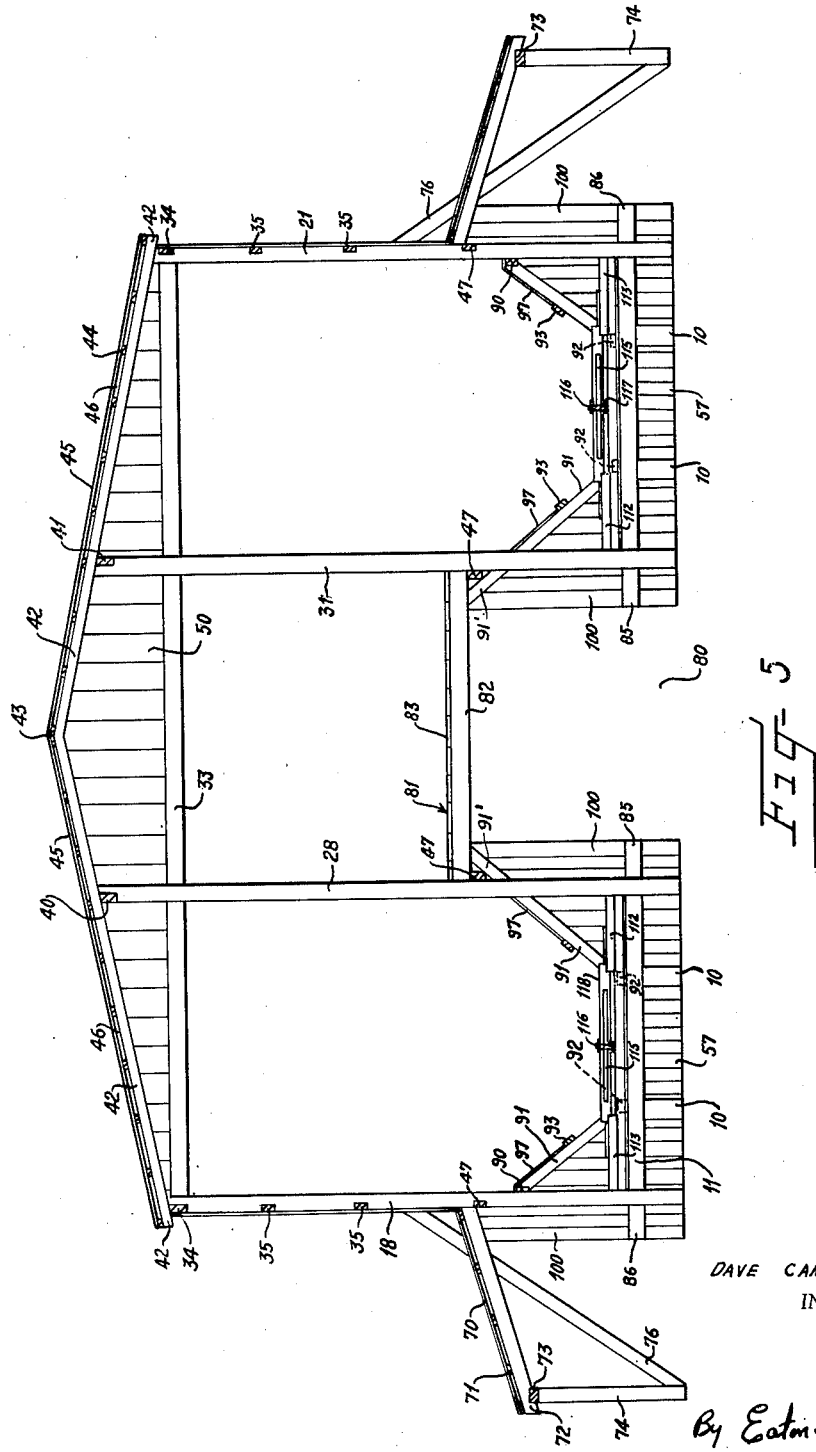

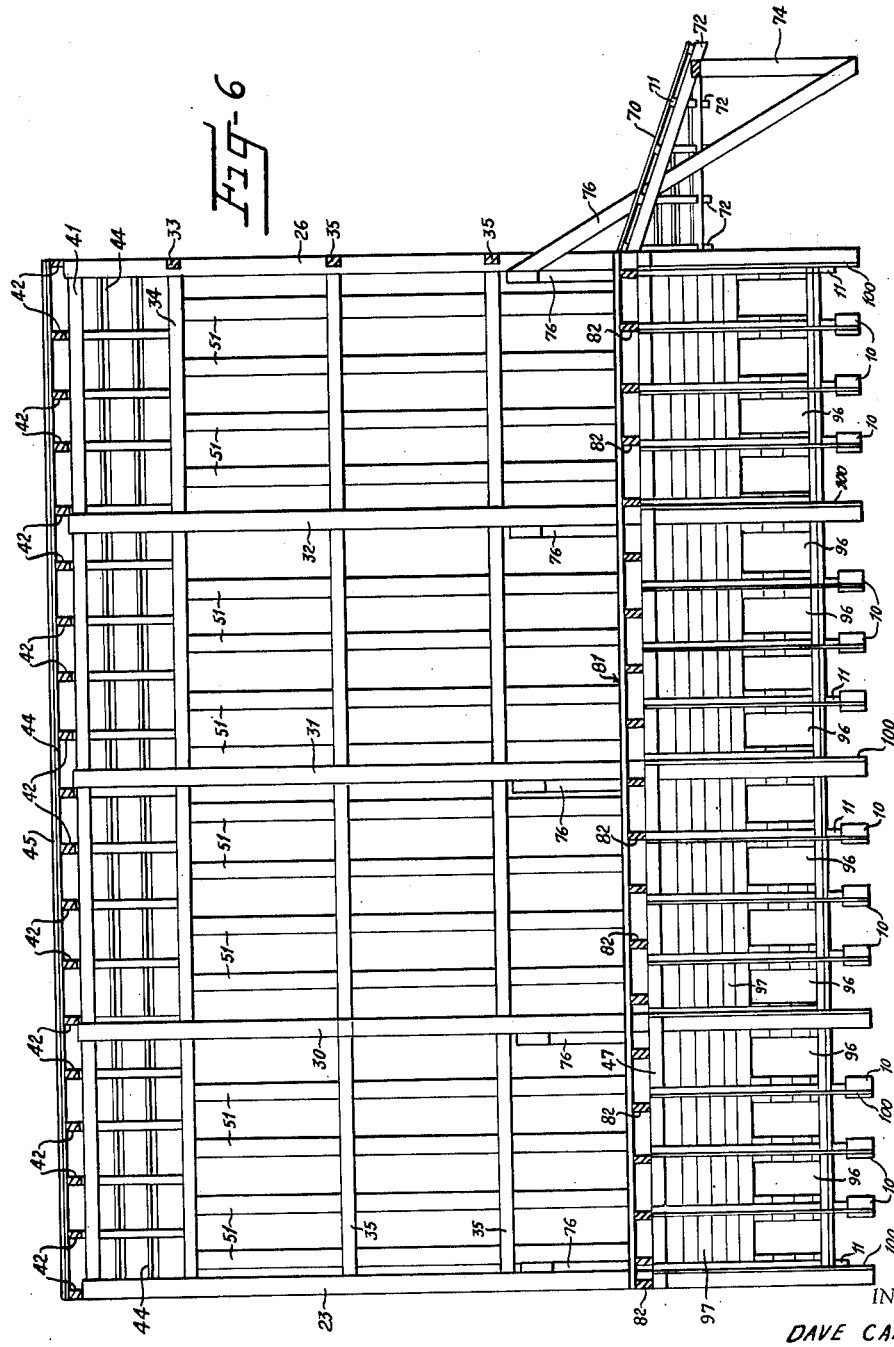

Patented Oct. 14, 1952

2,613,640

UNITED STATES PATENT OFFICE 2,613,640

HAY STORAGE AND FEEDING BARN

Dave Cameron, York, S. C.

Application October 30, 1950, Serial No. 192,967

4 Claims. (Cl. 119—16)

This invention relates to an improved barn particularly adapted to store hay in a manner to provide ample ventilation for the same and to also provide feeding space whereby cattle may eat the hay directly from the storage barn without the hay having to be moved therefrom.

It is an object of this invention to provide a barn formed with ventilated side and end walls and having two longitudinally extending hay racks therein adapted to receive hay and the bottom portion of said hay racks being provided with openings and said barn having a plurality of stalls adjacent each of the openings in the bottom portions of the hay racks whereby cattle may be quartered in the stalls and may reach the hay disposed in the hay rack.

It is another object of this invention to provide a hay storage and feeding barn wherein quantities of hay may be stored and having means providing the maximum ventilation for the hay and said barn being so designed as to provide a maximum number of feeding stations to permit cattle to have access to the hay.

In hay barns and racks heretofore provided for storing hay and having means for the cattle to feed, upon cattle eating out portions of the hay an arch would be formed in the hay thus preventing the hay from falling downwardly and cattle could not reach the remaining portions of the hay. It is therefore another object of this invention to provide a barn having hay storage racks therein and means positioned in the bottom of the hay storage racks for agitating the hay to break down arches which have been formed to insure that the hay will always be disposed adjacent the feeding stations and readily accessible to the cattle.

It is another object of this invention to provide a hay barn which is ventilated to provide ventilation for the hay and which has two longitudinally extending racks therein, said longitudinally extending racks defining a passageway down the center of the barn, and said racks having feeding stations on both sides thereof to provide four lines of feeding stations for the cattle and the lower portion of the walls of said racks are slanted and have openings therein whereby the hay contained therein will be accessible to the cattle, and the lower portions of said racks have a plurality of transverse movable members mounted therein, said movable members being connected by longitudinally extending pivotal members and having projections thereon adapted to be engaged by a jack for movement of the same whereby movement of said movable members in said hay rack will cause agitation of said hay to break up any formations thereof and to insure that an ample supply of hay will be disposed adjacent the openings in the hay racks.

Some of the objects of the invention having been stated, other objects will appear as the description proceeds when taken in connection with the accompanying drawings in which—

Figure 1 is an isometric view of the improved hay storage and feeding barn;

Figure 2 is a side elevation of the improved barn made on a slightly enlarged scale;

Figure 3 is an end elevation of one end of the improved barn looking at the right-hand end of Figure 2 made on a slightly enlarged scale;

Figure 4 is a sectional plan view of the improved barn taken substantially along the line 4—4 in Figure 2 made on a slightly enlarged scale;

Figure 5 is a vertical sectional view through the barn taken along the line 5—5 in Figure 2 made on a slightly enlarged scale;

Figure 6 is a longitudinal sectional view through the barn and taken substantially along the line 6—6 in Figure 3 made on a slightly enlarged scale;

Figure 7 is an enlarged isometric view of the movable means adjacent the feeding stations in said barn for agitating hay disposed therein.

Referring more specifically to the drawings the numeral 10 designates a plurality of foundation members such as concrete blocks which support a plurality of transversely extending horizontal floor beams 11 and a plurality of longitudinally extending floor beams 12. A plurality of vertically extending corner posts 13, 14, 15 and 16 are provided and are secured adjacent their lower ends to the beams 11 and 12 at the corners of the barn. Additional vertical posts 17, 18 and 19 are disposed in spaced relation between the posts 13 and 14 and additional vertical posts 20, 21 and 22 are spaced between the posts 16 and 15. A pair of vertically extending posts 23 and 24 are positioned in spaced relation between the posts 13 and 16 and posts 25 and 26 are positioned in spaced relation between the posts 14 and 15. A plurality of posts 27, 28 and 29 are positioned in spaced relation between and in alinement with the posts 23 and 26 thus providing corner posts and four rows of vertically extending posts for supporting the barn structure.

The vertically extending posts 13 to 32, inclusive, are connected at their upper ends by a plurality of transversely extending beams 33 and a plurality of longitudinally extending beams 34. The vertically extending posts 13 and 16 and 14 and 15 are secured together intermediate their ends by a plurality of horizontal transversely extending beams 35.

The vertically extending posts 23 to 32, inclusive, extend upwardly substantially higher than the posts 13 to 22, inclusive, and are connected at their upper ends by longitudinally extending beams 40 and 41 and a plurality of rafters 42 are supported by the longitudinally extending beams 34, 40 and 41 and are connected at their proximate ends at the apex or hip of the roof as at 43. A plurality of longitudinally extending studs 44 are secured to the rafters 42 for supporting suitable roofing 45. Referring to Figure 3 it will be observed that the rafters 42 supported by the longitudinally extending beams 34 provide air spaces 46 for ventilation of the upper part of the barn.

A plurality of siding members 50 are secured to the endmost transverse beam 33 and to the endmost rafters 42 to thus enclose the upper triangularly-shaped portion of each of the end walls of the barn. The side walls of the barn are formed of a plurality of vertically extending spaced members 51 secured at their upper ends to the longitudinally extending beams 34 and at their lower ends to the outermost of longitudinally extending beams 47 connecting the vertically disposed posts 13 to 32, inclusive, intermediate their height. The vertically extending members 51 are spaced from each other to provide openings 52 throughout the length of the sides of the barn to permit air to flow therethrough for ventilating the contents of the barn.

One of the end walls of the barn, as will be observed in Figure 3, is also constructed in a manner to provide ample ventilation and has a plurality of vertically extending members 55 secured at their upper ends to the endmost transverse beams 35. The spaced members 55 provide ventilation openings 56. The lowermost portion of the end of the barn shown in Figure 3 is preferably enclosed by a plurality of siding members 57 suitably secured to endmost transverse beam 11 and to the lowermost transverse beam 35 and to the posts 14, 25, 26 and 15, said siding members 57 extending from each side of the barn and stopping short of the midway point thereof to form an opening 58 in the end wall of the barn.

The other end wall of the barn, remote from that shown in Figure 3 and which will be observed more clearly in Figure 1 is provided with a plurality of doors 60, 61 and 62 which may be of any conventional structure and are preferably sliding doors mounted by suitable means not shown. These doors are suitably hung from the upper portion of this end wall of the barn and extend to a point substantially midway of the vertical height thereof or substantially even with the lowermost beam 35 connecting the posts 13, 24, 23 and 16. A barn of this type is particularly adapted to be constructed on a hillside whereby the level of the ground will be adjacent the level of the lower edge of the doors 60, 61 and 62 so that vehicles can drive up to or through the doors 60, 61 and 62 for unloading material into the barn. If desired the barn may be constructed on level ground and a ramp 65 may be provided of any suitable construction such as earthwork, concrete, or wood and vehicles may thus drive up this ramp to unload material into the barn through the doors 60, 61 and 62.

The side walls of the barn are provided with feeding stations to be presently described and in order to protect cattle feeding in these stations, an auxiliary roof is provided which extends around two sides and one end of the bar. This shed or roof is shown at 70 and is supported by a plurality of longitudinally extending members 71 supported on slanting beams 72 secured at one of their ends to the longitudinally extending beams 47 connecting the vertically disposed posts 13 to 22, inclusive, and are secured at their other ends to longitudinally extending beams 73 connecting the upper ends of a plurality of shorter vertically disposed posts 74 which are spaced from the side walls of the barn and are of lesser vertical height than the height of the beams 52. The posts 74 are preferably spaced apart substantially the same distance as the spacing between the posts 13, to 22, inclusive, and these posts 74 are secured in position by a plurality of diagonally extending frame members 76 secured in one of their ends to the lowermost portion of the posts 74 and which pass upwardly through the roof 70 and are secured intermediate their ends to the slanting beams 72 and have their uppermost ends secured to the respective vertically disposed posts 13, to 22, inclusive, to thus provide a suitable support for the roof 70.

The space between the lines of posts 13, 17, 18, 19, 14, 24, 27, 28, 29 and 25 provides one hay storage section and the space between the lines of posts 16, 20, 21, 22, 15, 23, 30, 31, 32 and 26 provides a second hay or feed storage section. The space between the lines of posts 24, 27, 28, 29, 25, 23, 30, 31, 32 and 26 provides a passageway 80 extending through the lower part of the center portion of the barn and a loft 81 extending longitudinally through the uppermost portion of the barn above the passageway 80, there being a plurality of transverse beams 82 having their ends secured to the posts 23 to 32, inclusive, respectively and having a plurality of boards 83 thereon, forming a floor.

The bottom portion of each of the hay receiving sections or feed receiving sections are constructed in an identical manner and bear like reference characters and only one side will be described. It will be observed in Figure 5 that the transversely extending beams 11 extend a substantial distance beyond the posts forming the walls of the feeding sections as at 85 and 86. A suitable floor 87 is provided on the upper surface of the beams 11, the floor 87 stopping adjacent the vertically extending posts defining the side walls of the feeding sections.

The outer vertically extending posts 13, 17, 18, 19, 14, 16, 20, 21, 22 and 15 have longitudinally extending beams 90 secured on the inner surfaces thereof intermediate the floor 87 and the beams 35 and to the members 90 are connected the upper ends of a plurality of diagonally extending frame members 91 having their lower ends connected to longitudinally extending members 92 secured on the floor 87 and spaced inwardly from the outer walls of the barn. A longitudinally extending member 93 is secured to the upper inner surface of each of the diagonally extending members 91 and extends longitudinally thereof intermediate the ends thereof. A suitable covering 95 covers the upper portion of the diagonally extending members 91 between the longitudinally extending member 93 and the longitudinally extending member 90 thus providing a plurality of openings 96 along the length of each side of the feeding sections. The openings 96 may be restricted by boards 97 secured on each side thereof if desired.

In the preferred embodiment of this invention four feeding openings 96 are spaced between each of the posts 13 to 32, inclusive. A plurality of vertically extending members 100 are secured adjacent their lower ends to the end portions 85 and 86 of the transverse beams 11 and are secured at their upper ends to the slanting beams 72, said members 100 also being disposed inwardly of the walls of the barn and secured to the members 91 and to the beams 11. The upstanding members 100 serve to provide a plurality of walls defining a plurality of feeding stalls, there being one feeding stall associated with each feeding opening 96 preferably four of such feeding stalls disposed between each of the posts 13 to 32, inclusive.

Referring to Figure 5 it will be observed that the members 91 associated with the inner walls of the barn formed by the posts 23 to 32, inclusive, are illustrated as being slightly different from the members 91 heretofore described in that the members 90 are omitted and the diagonally extending members 91 have extensions 91' which extend beyond the posts 23 to 32, inclusive, and are secured at their upper ends to the beams 82 supporting the loft floor 81. The covering 95 associated with the inner walls extends up the diagonally extending members 91 and then is secured to the inner surfaces of the posts 23 to 32, inclusive. Otherwise the structure associated with the inner walls is identical to that just described associated with the outer walls.

It is thus seen that there is provided a hay or feed storage barn having two longitudinally extending storage sections and each of said sections being provided with a line of stalls and feeding openings or stations on each side thereof the walls of the lowermost portions of said sections being slanted inwardly and said barn also having doors in the upper portion thereof to permit feed to be placed within said storage and feeding sections and to fall downwardly and to be available to cattle through the feeding openings 96.

Now, when a large amount of feed such as hay has been stored in the barn and cattle have eaten away portions of hay through the openings 96 an arch in the hay is formed extending longitudinally of each of the storage sections and this arch will normally hold the hay or feed in the uppermost portions of the barn and will prevent the same from falling downwardly adjacent the feeding openings 96.

In order to provide effective means for breaking up the arch of feed formed in the feeding sections improved means are embodied in this invention and are disposed adjacent the floor 87 of each of the feeding sections, said improved means being movable for agitating the feed disposed thereabove to break the arch of the same to cause the feed to fall downwardly adjacent the feeding openings 96.

Referring to Figure 7 it will be observed that this improved means for causing movement of the hay comprises a plurality of transversely extending members 110 which are of lesser length than the distance between the posts 19 and 29, for example, illustrated in Figure 7 as the width of the feeding section at its lowermost point and each of the movable members 110 is provided with a cut away notch portion 111 forming a butt at each end thereof. The movable member 110 moves in channels 112 and 113 secured to the upper surface of a transverse rail 114 resting on the floor 87. The movable member 110 is preferably braced intermediate its ends by metal plates 115 and has pivotally secured intermediate its ends as at 116 the ends of brackets 117 connected to the ends of longitudinally extending members 118. A suitable channel or trackway 120 may also be provided to support the brackets 117 and the movable member 110.

Referring to Figure 4 it will be observed that one of the movable members 110 is disposed between each of the posts 13 to 32, inclusive so that a plurality of these movable members are disposed on the floor 87 of each of the feeding and storage sections, all of said members being connected by a plurality of longitudinally extending members 118 which also serve to agitate the feed disposed thereabove.

Now, when it is desired to break up an arch of hay formed above the members 110 and 118, a suitable hand operated jack, not shown, is positioned with the base thereof adjacent the notch 111 at one end of the movable member 110 and with the movable portion thereof adjacent the corresponding vertically disposed post, or vice versa, and the jack may then be actuated to move the movable member 110 to where its other end will be disposed adjacent the vertically disposed post 13 to 32 corresponding thereto. The pivotal connection 116 will cause the longitudinally extending member 118 to move slightly and will permit movement of the movable member 110 and this movement of the members 110 and 118 will cause agitation of the hay resting thereon and will tend to break the same up and to break the arch of hay formed thereabove. After one of the members 110 is moved in this manner the other members 110 may also be moved in a like manner and this will effect a complete breaking up of the arch in the feed and will cause the feed to fall downwardly adjacent feeding openings 96 where it may be reached by cattle positioned in the stalls.

In the drawings and specification there has been set forth a preferred embodiment of the invention and although specific terms are employed, they are used in a generic and descriptive sense only and not for purposes of limitation, the scope of the invention being defined in the claims.

I claim:

1. A feeding and storage barn having side walls and end walls supported by a plurality of spaced vertical posts, said storage barn also having a roof, at least two longitudinally extending storage sections within said barn, said storage sections extending in parallel relation to each other and having a passageway therebetween, the lower walls of each of said storage sections converging inwardly toward each other and having a plurality of feeding openings therein, whereby cattle may be positioned adjacent said feeding openings to reach feed within said storage sections, each of the storage sections having a plurality of spaced transversely movable members near the bottom thereof, a plurality of longitudinally extending members disposed between the transverse members and being pivotally connected at their ends to the transverse members, whereby when movement is imparted to the transversely and longitudinally extending members, the contents of the storage sections will be agitated.

2. In a storage and feeding barn having a frame and a plurality of walls, said frame of the barn defining a pair of parallel spaced storage sections having a passageway therebetween, each of said storage sections being provided with a plurality of feeding stalls on each side thereof adapted to have cattle positioned therein, the lower portion of each side of said storage sections having a plurality of openings therein coinciding with said feeding stalls to permit access to the feed disposed therewithin, and a plurality of transversely and longitudinally extending movable members in the lowermost portion of each storage section pivotally connected to each other for agitating the contents of the storage sections when movement is imparted to said transversely and longitudinally extending members.

3. In a storage and feeding barn having a frame and a plurality of walls, said frame of the barn defining a pair of parallel spaced storage sections having a passageway therebetween, each of said storage sections being provided with a plurality of feeding stalls on each side thereof adapted to have cattle positioned therein, the lower portion of each side of said storage sections having a plurality of openings therein coinciding with said feeding stalls to permit access to the feed disposed therewithin, each of said storage sections having a plurality of transverse trackways spaced therein, a transverse bar slidably positioned in each of said trackways, each of said transverse bars being movable in said trackways to agitate feed disposed within said storage sections.

4. In a storage and feeding barn having a frame and a plurality of walls, said frame of the barn defining a pair of parallel spaced storage sections having a passageway therebetween, each of said storage sections being provided with a plurality of feeding stalls on each side thereof adapted to have cattle positioned therein, the lower portion of each side of said storage sections having a plurality of openings therein coinciding with said feeding stalls to permit access to the feed disposed therewithin, each of said storage sections having a plurality of transverse trackways spaced therein, a transverse member slidably positioned in each of said trackways, each of said transverse members being movable in said trackways to agitate feed disposed within said storage sections and a plurality of longitudinally extending members having each of their ends pivotally connected to said transverse members at a point intermediate the ends of the transverse members.

DAVE CAMERON.

REFERENCES CITED

The following references are of record in the file of this patent:

UNITED STATES PATENTS

| Number | Name | Date |
|---|---|---|
| 332,530 | Houk | Dec. 15, 1885 |
| 440,369 | Saucerman | Nov. 11, 1890 |
| 596,804 | Busch | Jan. 4, 1898 |
| 2,445,165 | Carmo | July 13, 1948 |

OTHER REFERENCES

Popular Science, January 1950, pages 124 and 125.